(12) United States Patent
Eisenberg et al.

(10) Patent No.: US 10,981,732 B2
(45) Date of Patent: Apr. 20, 2021

(54) DEVICE FOR RELIABLY MOVING ARTICLE FROM CONVEYOR SURFACE

(71) Applicant: United Sortation Solutions, LLC, Mason, OH (US)

(72) Inventors: Howard Eisenberg, Owings Mills, MD (US); Darius Scott, Owings Mills, MD (US)

(73) Assignee: United Sortation Solutions, LLC, Owings Mills, MD (US)

( * ) Notice: Subject to any disclaimer, the term of this patent is extended or adjusted under 35 U.S.C. 154(b) by 0 days.

(21) Appl. No.: 16/387,646

(22) Filed: Apr. 18, 2019

(65) Prior Publication Data

US 2019/0241373 A1 Aug. 8, 2019

Related U.S. Application Data

(63) Continuation of application No. 14/487,753, filed on Sep. 16, 2014, now abandoned, and a continuation-in-part of application No. PCT/US2014/012283, filed on Jan. 21, 2014.

(60) Provisional application No. 61/754,488, filed on Jan. 18, 2013.

(51) Int. Cl.
| | | |
|---|---|---|
| *B65G 47/84* | (2006.01) | |
| *B65G 47/82* | (2006.01) | |
| *B07C 3/06* | (2006.01) | |
| *B07C 5/36* | (2006.01) | |
| *B07B 13/05* | (2006.01) | |

(52) U.S. Cl.
CPC ............. *B65G 47/841* (2013.01); *B07C 3/06* (2013.01); *B07C 5/36* (2013.01); *B65G 47/82* (2013.01); *B07B 13/05* (2013.01)

(58) Field of Classification Search
CPC .. B07C 5/36; B07C 3/06; B65G 47/74; B65G 47/82; B65G 47/841; B65G 47/844; B65G 47/845; B65G 47/8838; B65G 47/8846; B07B 13/05
See application file for complete search history.

(56) References Cited

U.S. PATENT DOCUMENTS

| | | |
|---|---|---|
| 1,432,002 A | 10/1922 | Wentz |
| 3,026,988 A | 3/1962 | Fisk |
| 3,045,801 A | 7/1962 | Graybeal |
| 3,515,254 A | 6/1970 | Gary |
| 3,902,592 A | 9/1975 | Buschbom et al. |
| 3,955,678 A | 5/1976 | Moyer |

(Continued)

FOREIGN PATENT DOCUMENTS

| | | |
|---|---|---|
| DE | 2038620 A1 | 2/1972 |
| DE | 19547641 A1 | 6/1997 |

(Continued)

OTHER PUBLICATIONS

Extended European Search Report for corresponding European Application No. 18182778.3 dated Oct. 12, 2018, 9 pages.

(Continued)

*Primary Examiner* — Charles A Fox
*Assistant Examiner* — Kalyanavenkateshware Kumar
(74) *Attorney, Agent, or Firm* — Alston & Bird LLP

(57) ABSTRACT

A device for reliably sweeping or sorting an article from a main conveyor surface that is positioned above the main conveyor surface and includes a paddle assembly that can be adjusted for moving various different articles from the main conveyor.

23 Claims, 9 Drawing Sheets

(56) References Cited

U.S. PATENT DOCUMENTS

| | | |
|---|---|---|
| 4,039,070 A | 8/1977 | Harrison |
| 4,264,002 A | 4/1981 | Van Der Schie |
| 4,501,365 A | 2/1985 | Peyton et al. |
| 4,643,291 A | 2/1987 | Counter et al. |
| 4,708,237 A | 11/1987 | Buisson et al. |
| 4,730,718 A | 3/1988 | Fazio et al. |
| 4,732,260 A | 3/1988 | Canziani |
| 4,804,078 A | 2/1989 | Scata |
| 4,957,199 A | 9/1990 | Wokke et al. |
| 5,042,636 A | 8/1991 | Underwood |
| 5,078,256 A | 1/1992 | Hatano et al. |
| 5,271,703 A | 12/1993 | Lindqvist et al. |
| 5,275,272 A | 1/1994 | Ydoate |
| 5,361,889 A | 11/1994 | Howell et al. |
| 5,464,088 A | 11/1995 | Koerber |
| 5,620,102 A | 4/1997 | Finch |
| 5,628,408 A | 5/1997 | Planke et al. |
| 5,671,837 A | 9/1997 | Tazou et al. |
| 5,720,157 A | 2/1998 | Ross |
| 5,730,579 A | 3/1998 | Keck et al. |
| 5,921,378 A | 7/1999 | Bonnet |
| 5,950,798 A | 9/1999 | Bonnet |
| 5,977,501 A | 11/1999 | Werkheiser et al. |
| 5,979,633 A | 11/1999 | Bonnet |
| 6,015,039 A | 1/2000 | Bonnet |
| 6,186,006 B1 | 2/2001 | Schmitz et al. |
| 6,189,702 B1 | 2/2001 | Bonnet |
| 6,208,908 B1 | 3/2001 | Boyd et al. |
| 6,220,421 B1 | 4/2001 | Hugon et al. |
| 6,533,099 B2 | 3/2003 | Bonham et al. |
| 6,695,135 B1 | 2/2004 | Lapeyre |
| 2002/0170850 A1 | 11/2002 | Bonham et al. |
| 2003/0155213 A1 | 8/2003 | Tatar et al. |
| 2007/0051585 A1 | 3/2007 | Scott et al. |
| 2012/0024661 A1 | 2/2012 | Wilson et al. |

FOREIGN PATENT DOCUMENTS

| | | | |
|---|---|---|---|
| FR | 2620053 A1 | 3/1989 | |
| FR | 2620054 A1 | 3/1989 | |
| JP | H05-178451 A | 7/1993 | |
| WO | 2008/022940 A1 | 2/2008 | |

OTHER PUBLICATIONS

Extended European Search Report for European Application No. 14740925.4 dated Jun. 8, 2016, 8 pages.
International Preliminary Report on Patentability for International Application No. PCT/US2014/012283, dated Apr. 10, 2015.
WIPO: International Search Report for International Publication No. WO 2014/113774 A1—dated May 14, 2015 for International Application No. PCT/US2014/012283 as filed on Jan. 21, 2014.
Written Opinion of the International Searching Authority for International Application No. PCT/US2014/012283, dated May 14, 2014.
Advisory Action (PTOL-303) dated Apr. 5, 2018 for U.S. Appl. No. 14/487,753.
Advisory Action (PTOL-303) dated Jun. 15, 2018 for U.S. Appl. No. 14/487,753.
Annex to the communication dated Jul. 24, 2017 for EP Application No. 14740925.
Applicant Initiated Interview Summary (PTOL-413) dated May 3, 2018 for U.S. Appl. No. 14/487,753.
Communication from the Examining Division dated Jul. 24, 2017 for EP Application No. 14740925.
Communication pursuant to Rules 70(2) and 70a(2) for European Patent Application No. 16/387,646, dated Jun. 24, 2016, 1 page.
Decision to grant a European patent dated Jul. 12, 2018 for EP Application No. 14740925.
Final Rejection dated Dec. 11, 2017 for U.S. Appl. No. 14/487,753.
Final Rejection dated Jul. 14, 2016 for U.S. Appl. No. 14/487,753.
Final Rejection dated Mar. 13, 2019 for U.S. Appl. No. 14/487,753.
Intent to Grant for European Patent Application No. 14740925.4 dated Mar. 6, 2018, 6 pages.
Non-Final Rejection dated Aug. 27, 2018 for U.S. Appl. No. 14/487,753.
Non-Final Rejection dated Mar. 24, 2017 for U.S. Appl. No. 14/487,753.
Non-Final Rejection dated Sep. 30, 2015 for U.S. Appl. No. 14/487,753.

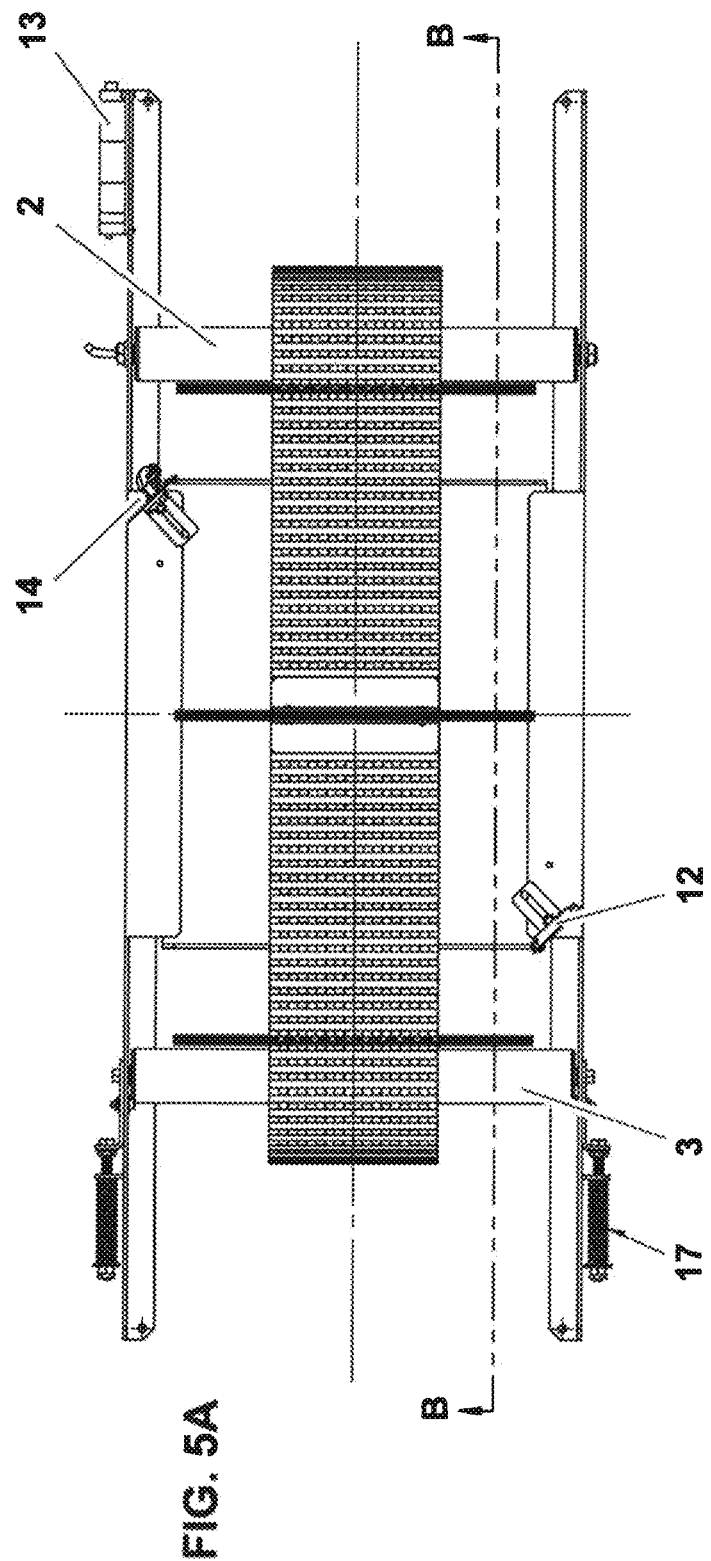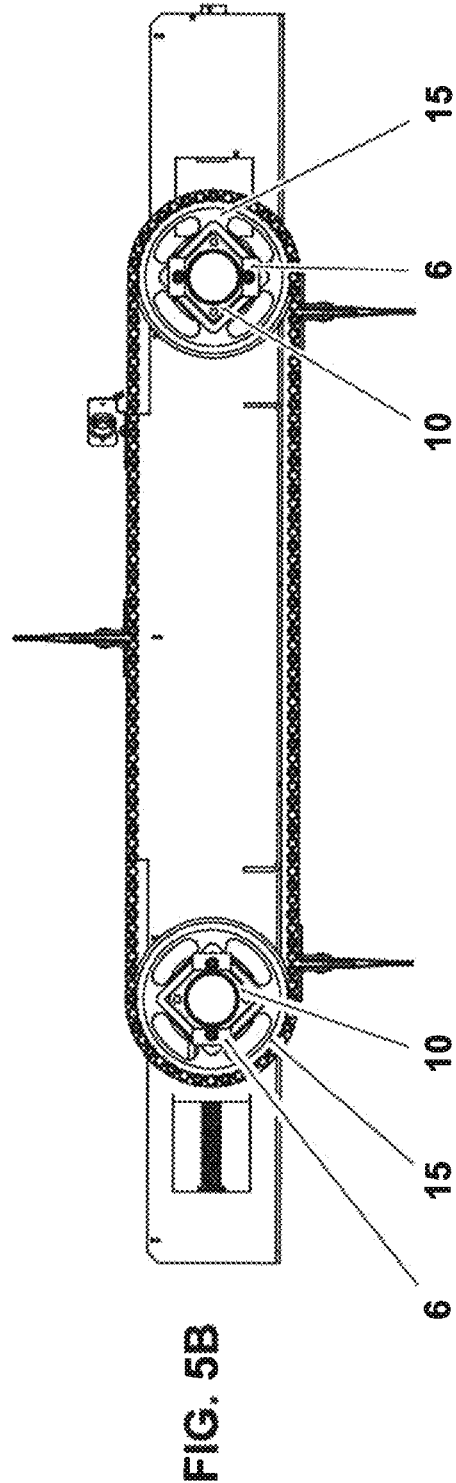
FIG. 5A
FIG. 5B

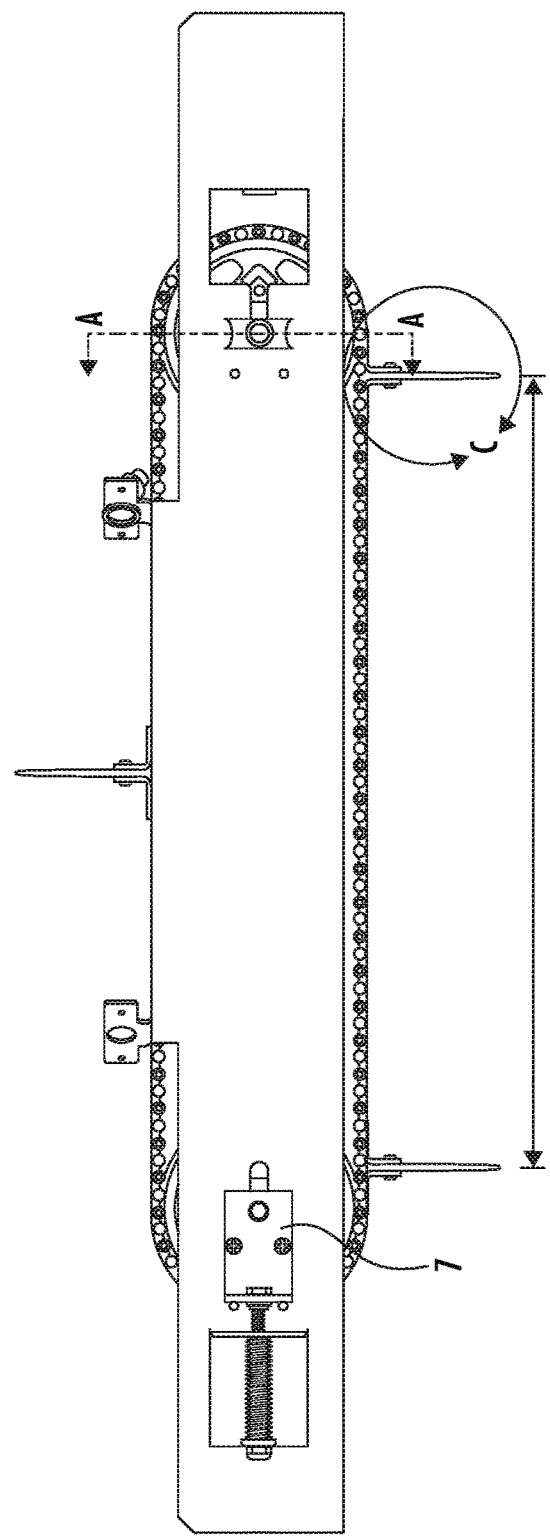
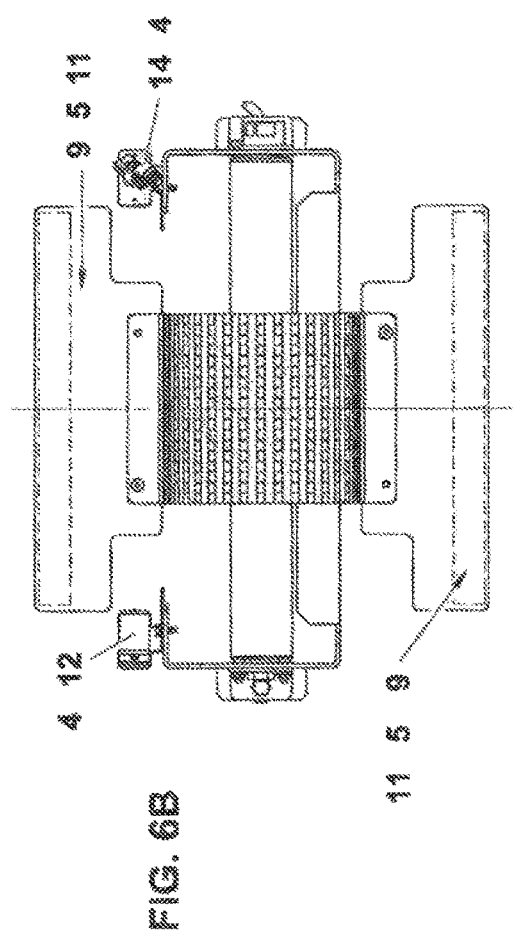
FIG. 6A
FIG. 6B

DEVICE FOR RELIABLY MOVING ARTICLE FROM CONVEYOR SURFACE

1. PRIORITY CLAIM

This application is a continuation application of and claiming the benefit of priority to U.S. application Ser. No. 14/487,753 entitled "DEVICE FOR RELIABLY MOVING ARTICLE FROM CONVEYOR SURFACE" filed on Sep. 16, 2014, which is a continuation in part of PCT Application US2014/012283 entitled "DEVICE FOR RELIABLY MOVING ARTICLE FROM CONVEYOR SURFACE filed on Jan. 21, 2014 which claims priority to U.S. Provisional Application 61/754,488 entitled "DEVICE FOR RELIABLY MOVING ARTICLE FROM CONVEYOR SURFACE filed on Jan. 18, 2013 entitled the entireties of which are incorporated by reference herein.

REFERENCE TO RELATED APPLICATIONS

This application claims priority to U.S. provisional application 61/754,488, filed Jan. 18, 2013, and is a continuation-in-part of PCT/US2014/012283, filed Jan. 21, 2014, and the entire contents of these documents are incorporated herein by reference.

INTRODUCTION AND BACKGROUND TO THE INVENTION

Methods for moving packaged, wrapped, or small items traveling on a conveyor to a delivery station or off of a main conveyor have a relatively high fail rate. As one of the critical last steps in sorting packages for delivery, the failure rate at this step requires human intervention, can involve delays, and leads to expense. The present invention addresses this and other problems in the field by providing an improved device for robust movement of a package or item from the main conveyor line or for sorting the package or item to another conveyor line. In one aspect, the device comprises multiple paddle pieces that are securely linked to each other and are supported by brackets against a flange from a sweeper belt separate from the main conveyor. The sweeper belt controls the movement of the multi-part paddle across the main conveyor surface to direct an item from the main conveyor. Generally, the paddle and sweeper belt are positioned above the main conveyor line or conveying surface. The combination of a secure paddle region and a more flexible bracket or fixture to the sweeper belt unexpectedly provides improved reliability in the sweep or sort process off of a conveyor.

BRIEF SUMMARY OF THE INVENTION

The embodiments, advantages, and uses described here and exemplified in the drawings are examples of the content of the invention and are not meant to limit the scope of the invention. In a preferred embodiment, a sweeper/sorter assembly sits above a flat main conveyor surface. Typically, the assembly comprises a plastic sweeper belt that is positioned to move a paddle or sweep surface perpendicular to the direction of travel of the main conveyor belt. It is not required to use a perpendicular direction, but aspects of the invention can use only a perpendicular direction. At least one and preferably a plurality of paddle modules can be connected to the plastic sweeper belt, preferably two, and embodiments with three paddle modules are shown in the exemplary drawings. Items to be sorted from the main conveyor will travel on the main conveyor belt and will be tracked using one or more cameras or electronic eyes, an encoder, a timing device, or other tracking system available. When a desired item for sorting is directly underneath the appropriate sweeper assembly, a signal is given for the drive roller controller to move the drive roller and thus the plastic sweeper belt and paddle module. The direction of the movement can be controlled to the appropriate direction to push or sweep the item by the paddle surface contacting the item, for example to the left or right, and then move the item off of the flat conveyor surface. Furthermore, the sweeper belt and paddle can be controlled to account for the speed of the main conveyor surface so the paddle contacts the desired article or package as it moves into a position directly under the sweeper belt.

The motorized driver roller can be activated by a drive roller controller and can run forwards or backwards. The direction of movement results in the left or right handed divert of the item when contacted by the paddle.

In an embodiment shown in the drawings, there are three sets of paddles (9) in paddle modules that are connected to the plastic sweeper belt (1). As shown, for example in FIG. 3, there are two paddle modules on the lower side of the plastic belt and one on the top side. As shown by the arrows depicting the distance between paddles in FIG. 6A, the location of each paddle or the distances between paddles can be controlled to account for the fine movement of one or all the paddles at the same time by sensing the position of only one paddle. Controlling the movement of the three module embodiment provides advantages for various types of sorting and quality control functions. The two paddle modules below the belt are positioned to be ready to move an item quickly when needed in either direction. Alternatively, if the sort direction is to only one side, the plastic sweeper belt can turn in one direction so that successive paddles will direct items off the conveyor as the belt continues to turn when directed. In addition, the exact location of each paddle module and paddle can allow the conveyor system a redundant control of the sort function. For example, photoelectric eyes (14, 12) can be used at multiple places. In one example a photoelectric eye (14—FIG. 5A) senses the position of one paddle above the plastic belt when in the home position (center—FIG. 3) and thus the system determines when the plastic belt has moved either left or right based on the known configuration of the second and third paddle modules in relation to the first paddle sensed above the plastic belt by the photoelectric eye. Optionally, paddles or elements of the paddle modules can be coated or contain reflective or coded markings to assist in the fine control of the paddle movements using an electronic eye or other sensor or tracking system as available in the art. Alternatively or in addition, photoelectric eyes can be used to determine the proximity of the sweeper paddle to the surface of the main conveyor and to determine if a package or article on the main conveyor is positioned on the main conveyor surface.

The construction of the paddle (9) and its connection to the plastic belt (1) are designed for robust and reliable use and can be tested to millions of cycles to ensure low failure rates and reliability. The plastic belt is constructed of multiple links. At the point where the paddle is connected to the belt there is a paddle link (18—FIG. 8) that has a flange molded into a link in the plastic belt or integrated into a formed link of the plastic sweeper belt. One optional design attaches two paddle brackets (5—one on each side of the link) and two paddle pieces (9) to the paddle link (18) by use of a bolt, screw, rivet, pin, or the like. The two paddle pieces are connected by an adhesive (11) to securely link them to each other. While a two-paddle option is shown in FIG. 8, more than two can be used and the paddle surfaces can be composed of multiple elements. The combination of the paddle bracket supported against the belt but not secured to belt directly, and the triangularity of the paddle pieces, work together to create a rigid and strong paddle design. Paddle elements are typically plastic, as some flexibility in the material selected for the paddle is desired. Completely rigid paddle elements, such as those made of stainless steel, can also be used. For embodiments used to sort packaged small items, for example small containers wrapped in mailing packaging (FIG. 9A), a rigid plastic paddle surface is preferred. In general, the selection of paddle surfaces can be a function of the item being sorted, so that the paddle surface moves within a small distance from the surface of the conveyor to ensure that the item is sorted and reduce the possibility that the item will jam on the conveyor or interfere with the sort process. For other, larger items, such as boxes, a metal surface may be preferable (FIG. 9B). The paddle link (18) can effectively be used to change paddles within paddle modules based upon the item being sorted. The end of the paddle (9) can optionally contain a flexible region that can contact the main conveyor surface in some embodiments. This optional region can be composed of durable and slideable material, such a various coatings available on hard plastic or other surfaces such as PTFE coatings. Alternatively, the optional end region can contain a brush element. In other embodiments, yet another region of the paddle surface can contain a rough coating or a high friction area to contact the packaged article on the main conveyor. Thus, in optional embodiments the paddle may contain three or more regions—a hard region to fix to the belt or a connection to the belt rigidly; a middle region with a high friction coating to contact the packaging or an article on the main conveyor; and an end region that is coated to allow smooth movement over the main conveyor surface. In addition, as the paddle assembly typically resides over the main conveyor surface, the paddle assembly can be moved up or down so that the paddle surface or end of the paddle can be positioned at an optimal location relative to the item being sorted. Factors such as the chance of damaging the item from the paddle, the size of the item, the type of item, the surface or packaging covering the item, and the speed of the conveyor can all dictate an optimum location of the paddle and paddle assembly for a particular system. The paddle assembly can also dynamically move up and down over the surface of the main conveyor in optional embodiments, whereby the distance between the lower end of the paddle and the top surface of the main conveyor can be controlled or adjusted.

In another aspect, the use of a motorized drive roller (2) with a plastic belt (1) forms a unique combination for sweep-type diverters or sorters and here can be important in the reliability of the design. The plastic sweeper belt (1) provides rigidity and accuracy to the design over alternative belt and linkage mechanisms. However, plastic belts and indeed all other belts have a tendency to stretch over time and more so in varying temperature conditions. To create a maintenance free and reliable device, a compression spring (17) can act as an automatic tensioning device to maintain proper a tension on the plastic belt that is used for diverting items. Thus, embodiments of the invention include a rigidly connected paddle link (18) integrated into a sweeper belt above a main conveyor surface where the sweeper belt drive includes a tensioning system, such as a compression spring (17), to correct for any stretch in the sweeper belt.

In addition, the attachment of the sprocket (15) to the motorized drive roller (2) should be cost effective and still robust. To accomplish this we have used a novel approach (FIG. 2) whereby welding a flange (10) to the drive roller and then placing a sprocket toe clamp (6) to attach the sprocket to the welded flange results in a strong but replaceable flange/drive roller connection between the two components.

BRIEF DESCRIPTION OF THE DRAWINGS

FIG. 5A: Sweeper Sorter Module plan view showing photoelectric eyes and FIG. 5B left side view.

FIG. 6A: Side view of sweeper sorter module and FIG. 6B close-up of end on view.

DETAILED DESCRIPTION

In contrast with other conveying systems that use a pusher device to move articles across and off a conveying surface from below or through the bottom of the conveying surface, the present invention employs a more robust sweeping action which can preferably be employed from above the conveying surface. As a result, there are fewer errors in the sorting of packages or other articles during the process of removing them from a conveying surface. In order to move or propel articles or packages from a conveyor surface, the paddle assembly is attached to a rigid belt. In general, the connection between the paddle assembly parts and the rigid belt are designed and built to ensure that the connection has little to no play when the paddle contacts the article on the conveyor surface. The design and construction of the paddle surface itself can be changed to allow some flexibility depending on the articles that are being moved. In addition, the paddle surface can comprise a region where it connects to the sweeper belt and a region where is contacts the article or package and these regions can be made of or coated with different elements. For example, the end or tip of the region designed to contact the article can be coated to allow it to brush up against the main conveyor surface or within 0.5 to 1 mm or within 0.5 to 2 mm of the main conveyor surface.

Figure 1:
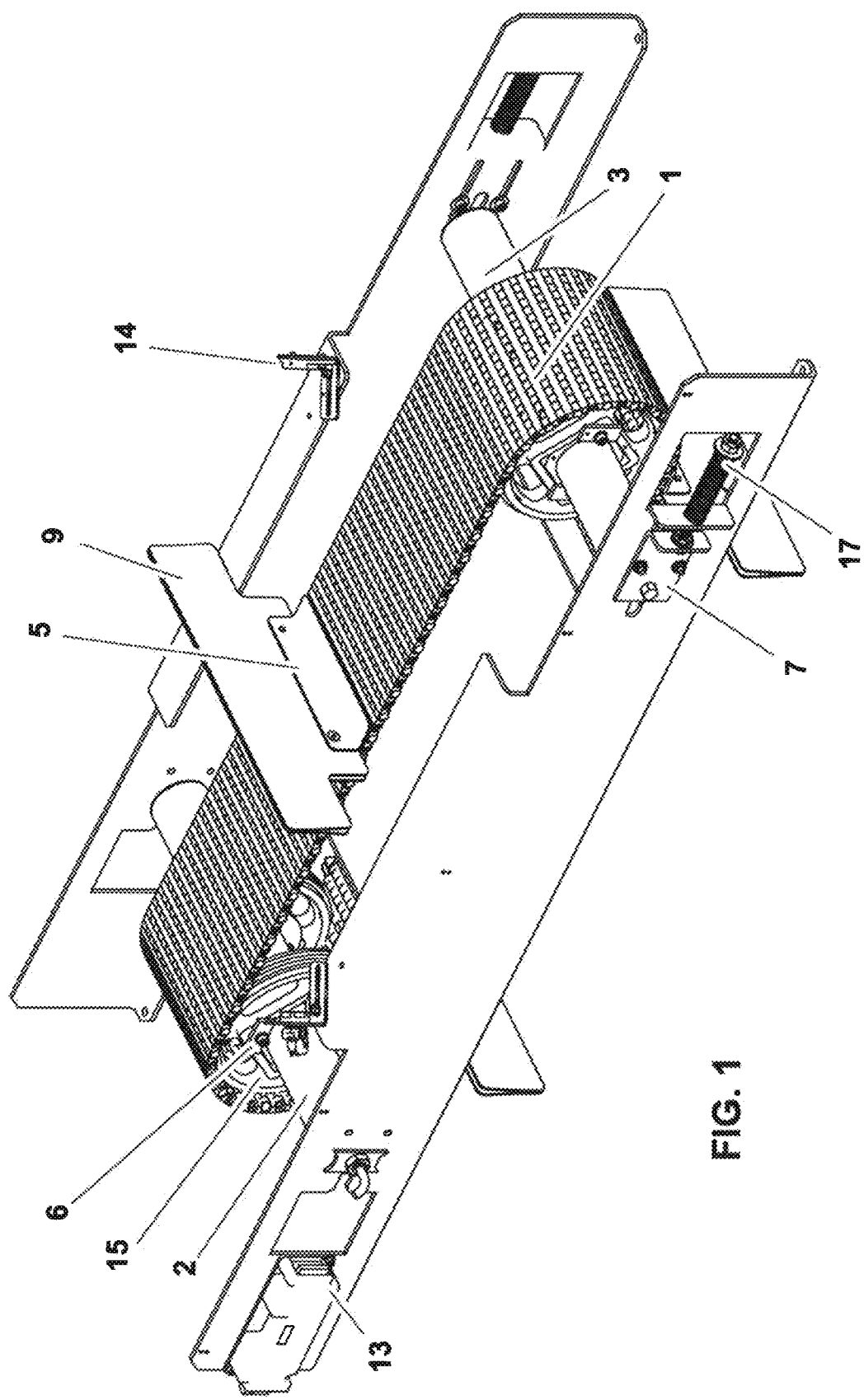
FIG. 1: Sweeper Sorter Module including the sweeper belt, belt drive and tensioning system, and paddles.
Figure 2:
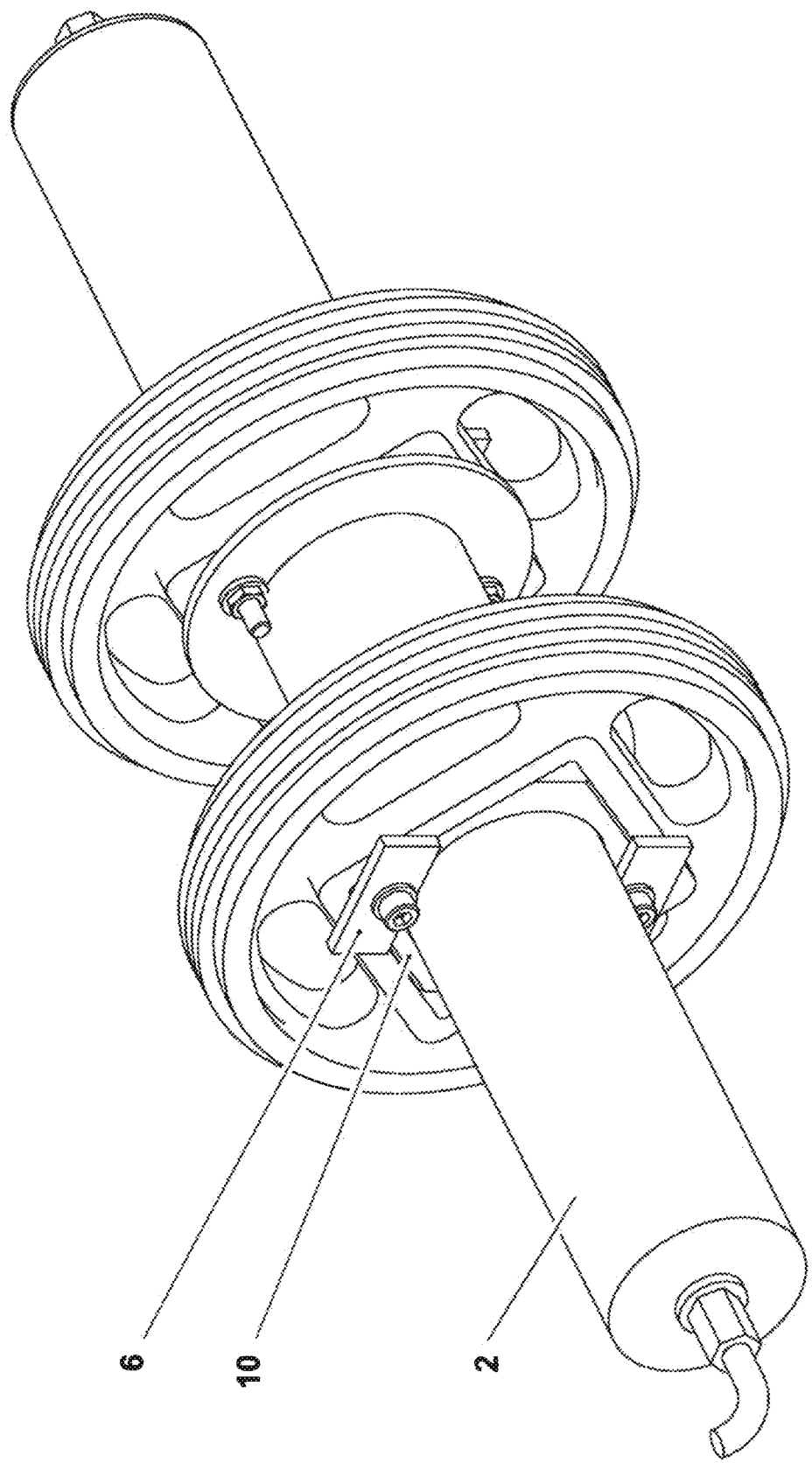
FIG. 2: Detail of Roller-Sprocket Assembly
Figure 3:
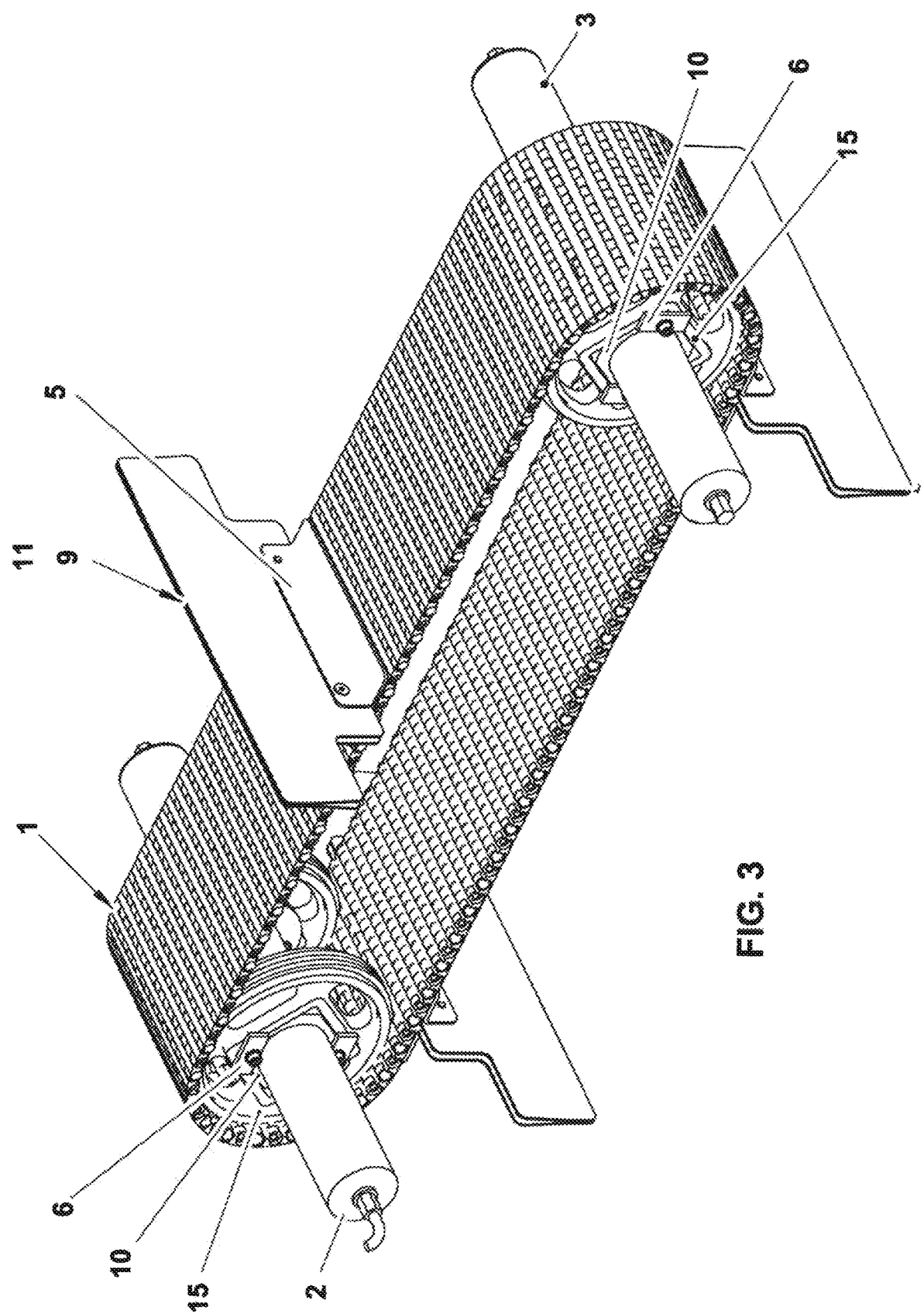
FIG. 3: View of plastic sweeper belt assembly and sprocket assembly with support frame removed.
Figure 4:
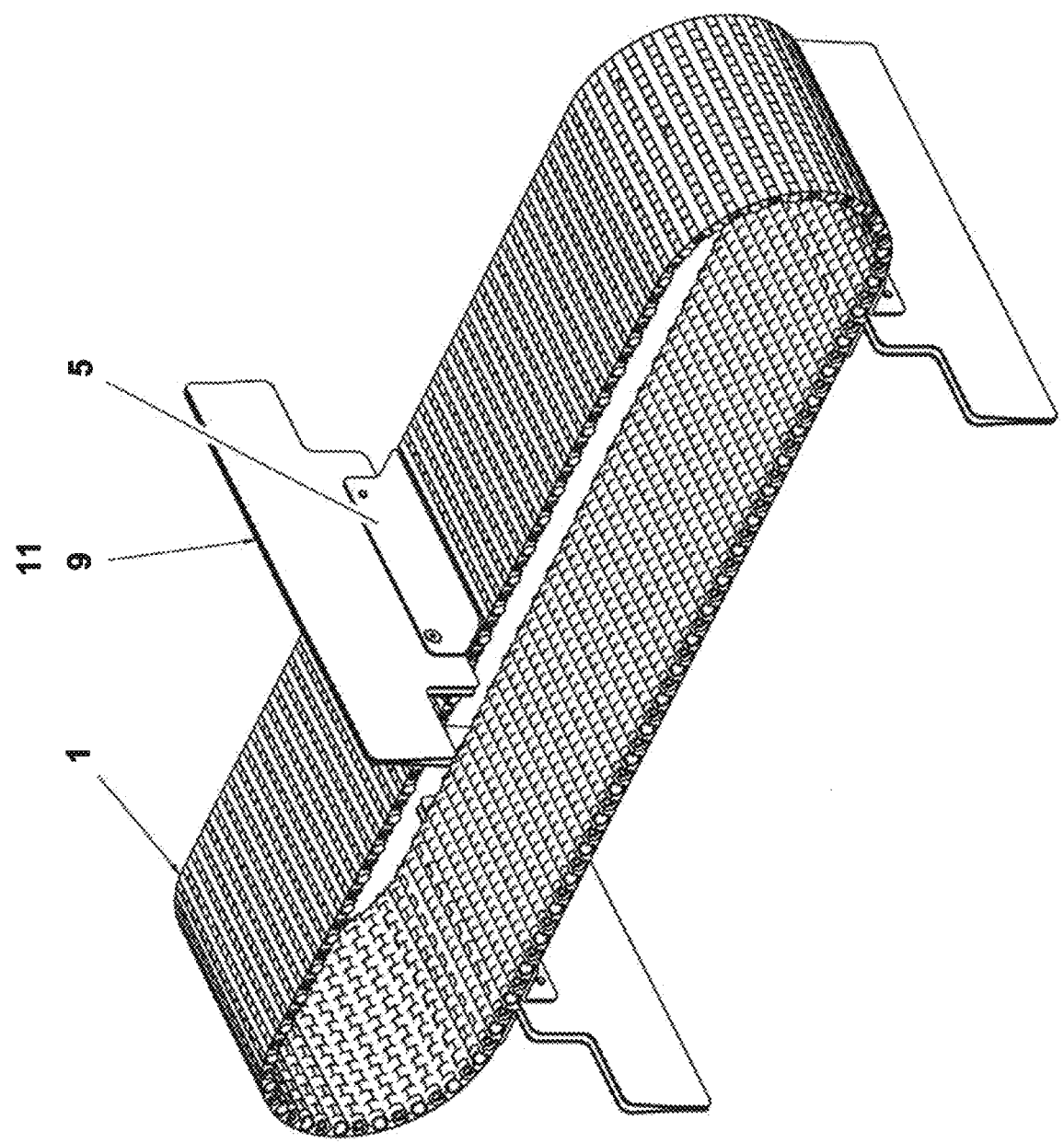
FIG. 4: Detail of plastic sweeper belt and embodiment showing spaced three-paddle sweeper assembly.
Figure 7:
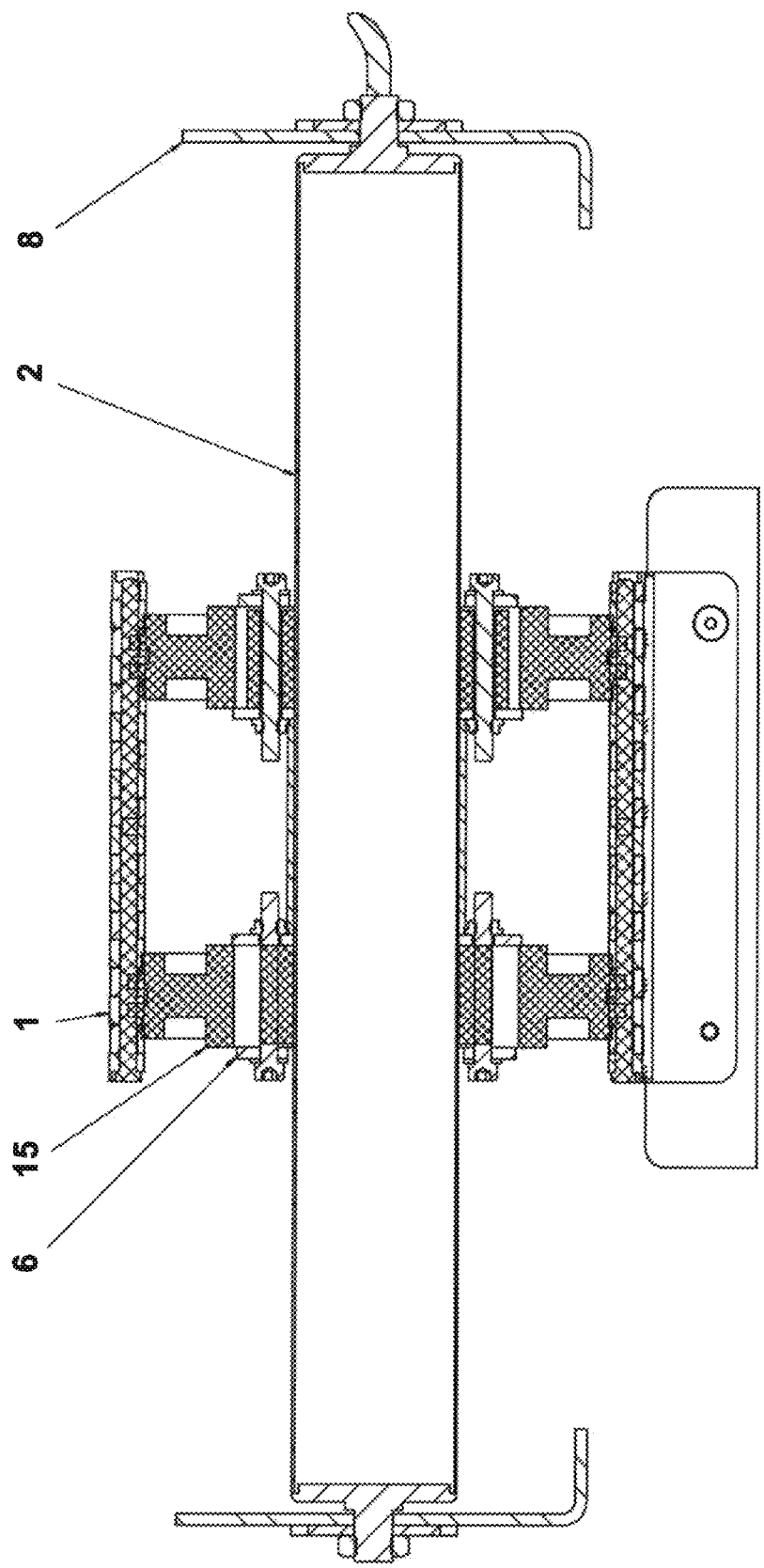
FIG. 7: Sweeper Sorter Module cross section view showing sprocket and toe clamp between sweeper belt and drive roller.
Figure 8:
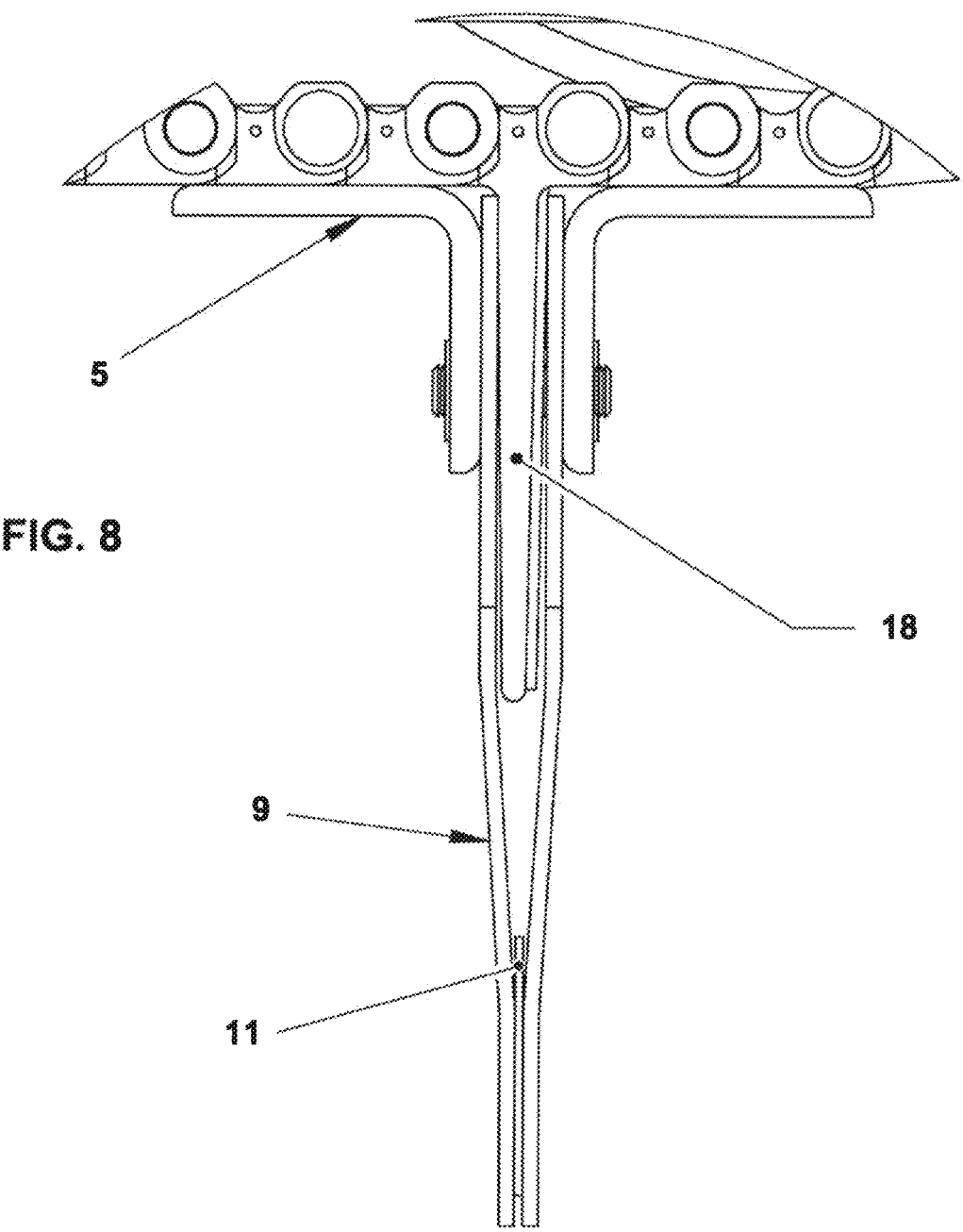
FIG. 8: Detailed view of embodiment of belt and paddle assembly connections as integrated link into sweeper belt.
Figure 9A:
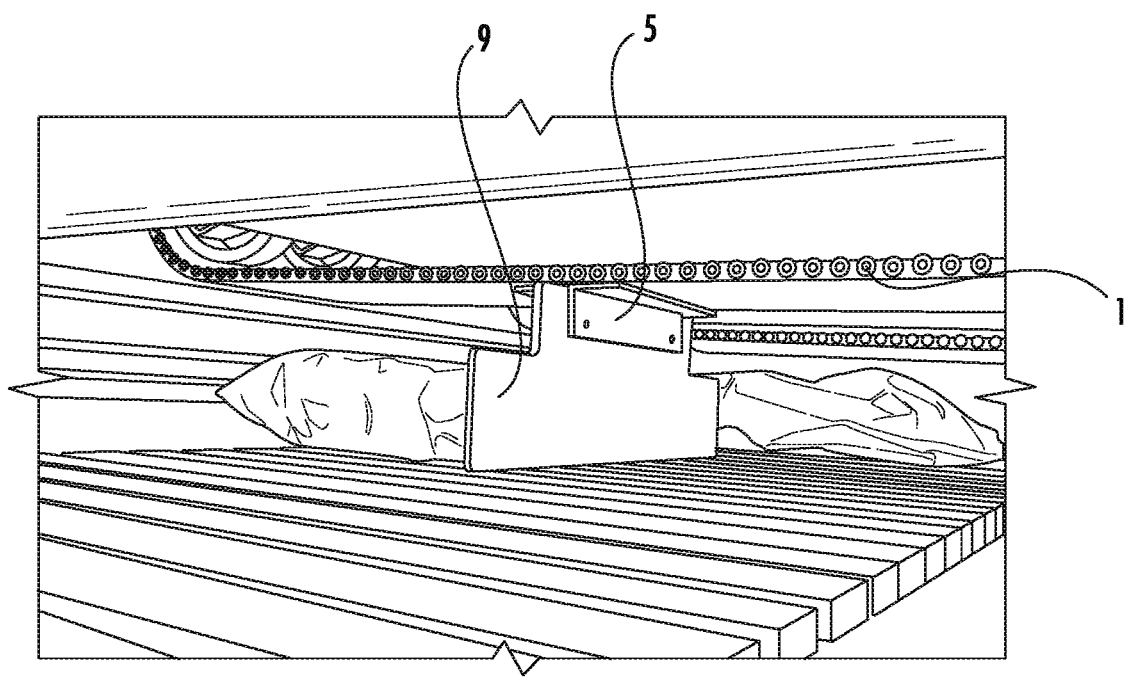
FIG. 9A: Photo of the paddle over a main conveyor used to sort packaged items and FIG. 9B photo of paddle used to sort boxes.
Figure 9B:
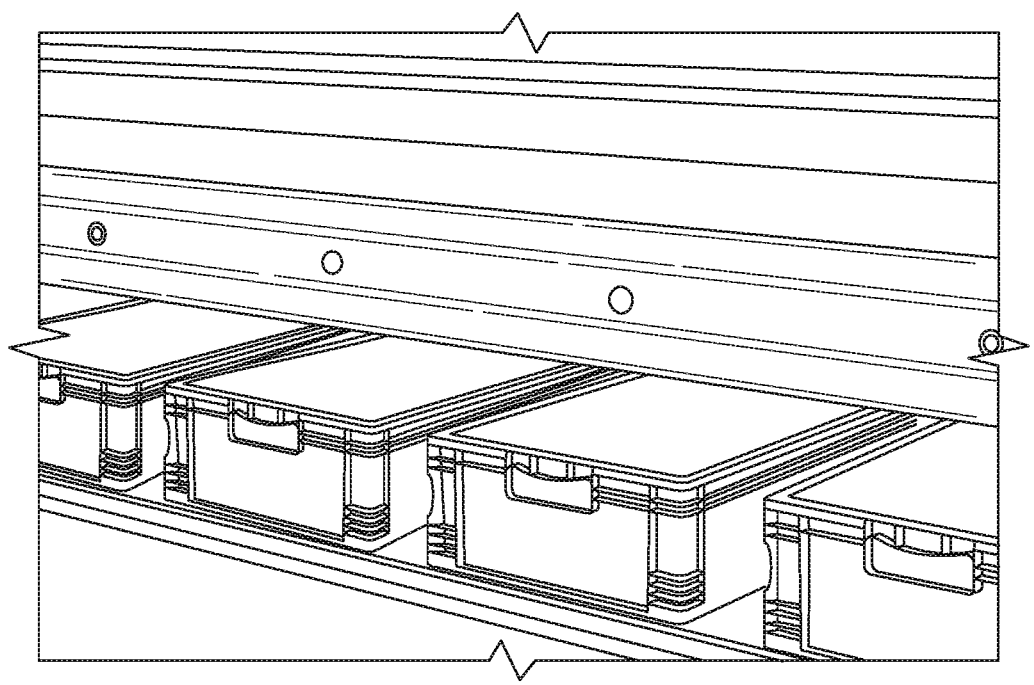

Thus, in preferred embodiments the invention includes a sorting device for moving an item off of a main conveyor surface that comprises a plastic paddle assembly that is firmly connected to a plastic sweeper belt, where the assembly and belt are positioned over the surface of a main conveyor. One or more electronic eyes can be used for detecting the presence of an object and its position, detecting the fine position of one or more of the paddles, and/or detecting the movement of the article from the main conveyor surface. There is a motorized drive roller employed in the sweeper belt to control the movement of the plastic sweeper belt. Similarly, the sorting device may contain a plastic paddle assembly that is removeably connected to a plastic sweeper belt, for example by a rigid bracket that is fixed to an integrated element of the plastic sweeper belt. The removeable paddles allows easy replacement or options when different articles are moving on the main conveyor surface. Various different paddle surfaces, paddles of different constructions, and various regions on the paddles can thus be used. IN fact, when two or more paddle assemblies are used in the sweeper belt, different paddles can be made of different materials to contact different articles on the main conveyor surface. Thus, both small wrapped packages and larger boxes can be robustly moved off the main conveyor surface in these embodiments without the need of changing the paddle s used. The invention includes aspects where one or more sensors are used for detecting the presence of an item on the main conveyor or its movement from the conveyor, or detecting the position of the one of more paddles. The sorting device can have a paddle made of a rigid plastic or metal material and can be connected to the sweeper belt through an integrated link (18) in the sweeper belt that projects out from the sweeper belt surface to form a surface of affixing the paddle surfaces. Multiple paddle surfaces can be used in one paddle assembly so that, for example, two paddle surfaces are affixed to one projection from the integrated link in the sweeper belt as shown in FIG. 8. The paddle assembly can include a bracket or brace (5) which is comprised of a different material than the paddle (9).

The lower end or tip surface of a paddle or the paddle assembly can be positioned at different distances from the top surface of the main conveyor surface when the paddle assemble is located above the main conveyor. Thus, the sweeper belt can be adjustably connected to a frame that allows the fine positioning of the end surfaces of the paddle and very close movement of the paddle to the main conveyor surface. The paddle assembly can have two ends with rollers to move the plastic sweep belt (1), one end having a drive roller to control the movement of the plastic sweep belt (1), the other end having a compression spring (17) to maintain the tension on the plastic sweeper belt (1). The paddles can be connected to the plastic sweeper belt by a flange in the plastic sweeper belt and at least one bracket fixed to the flange and linking the paddle to the belt.

The scope of the invention is not limited to the above description and explanations, and the following claims are exemplary of the many variations and embodiments possible included in this invention.

What is claimed is:

1. A device for moving an item off of a conveyor surface, the device comprising:
   two or more paddles connected to a continuous bi-directional sweeper belt, the two or more paddles and the bi-directional sweeper belt forming a paddle assembly positioned over the conveyor surface;
   a sensor for detecting the presence of the item; and
   a motor to control the movement of the bi-directional sweeper belt;
   wherein each of the two or more paddles of the paddle assembly is positioned to sweep over the conveyor surface to direct an item off the conveyor surface,
   wherein a first paddle of the two or more paddles is made of a different material than a second paddle of the two or more paddles; and
   wherein at least one paddle of the two or more paddles comprises a first region for connecting to the bi-directional sweeper belt, and a second region for sliding across the conveyor surface.

2. The device as claimed in claim 1, wherein the paddle assembly is configured to be positioned at different distances from a top surface of the conveyor surface.

3. The device as claimed in claim 1, wherein a paddle of the two or more paddles comprises a center region with a friction coating for contacting the item on the conveyor surface.

4. The device as claimed in claim 1, wherein the first region includes a rigid region.

5. The device as claimed in claim 1, wherein the second region is a flexible region which includes a brush.

6. The device as claimed in claim 1, wherein the bi-directional sweeper belt includes a plastic belt positioned between a pair of rollers, wherein one of the rollers is a motorized drive roller.

7. The device as claimed in claim 1, wherein a sprocket is attached to the pair of rollers and the bi-directional sweeper belt is looped around the pair of rollers.

8. A device for moving an item off of a conveyor surface comprising:
   two or more paddles connected to a bi-directional sweeper belt, wherein the bi-directional sweeper belt is adjustably connected to a support frame, wherein the two or more paddles and the bi-directional sweeper belt form a paddle assembly positioned over the conveyor surface, and the paddle assembly comprises a first end and a second end each having drive rollers attached to sprockets to move the bi-directional sweeper belt;
   at least one paddle bracket removably supported and fixed to an integrated element of the bi-directional sweeper belt, wherein the at least one paddle bracket connects at least one paddle of the two or more paddles to the bi-directional sweeper belt;
   wherein at least one paddle of the two or more paddles comprises a brush that is configured to slide across the conveyor surface; and
   wherein a first paddle of the two or more paddles is made of a different material than a second paddle of the two or more paddles.

9. The device as claimed in claim 8, wherein one of the rollers attached to the sprocket is a motorized drive roller activated by a drive roller controller.

10. The device as claimed in claim 8, wherein at least one of the rollers is attached to the sprocket via a welding flange and a sprocket toe clamp.

11. The device as claimed in claim 8, wherein the paddle assembly comprises a compression spring as an automatic tensioning device to maintain tension on the bi-directional sweeper belt.

12. The device as claimed in claim 8, further comprising a paddle link integrated into the bi-directional sweeper belt and attached to the at least one paddle bracket and the at least one paddle by one of a bolt, screw, rivet, or pin.

13. The device as claimed in claim 12, wherein the at least one paddle comprises two paddle pieces connected by an adhesive to securely link the two paddle pieces with each other.

14. The device as claimed in claim 9, wherein the motorized drive roller to control the movement of the bi-directional sweeper belt is capable of directing the two or more paddles to divert items from the conveyor surface toward either side of conveyor; and wherein the direction of movement of the motorized drive roller results in the left or right handed divert of the item from the conveyor surface when contacted by at least one of the two or more paddles.

15. The device as claimed in claim 8, wherein at least one paddle of the two or more paddles comprises (a) a rigid top region for connecting to the bi-directional sweeper belt, (b) a center region with a friction coating for contacting the item on the conveyor surface, and (c) a flexible end region for positioning close to the conveyor surface.

16. The device as claimed in claim 8, wherein the at least one paddle bracket connects the two or more paddles to the sweeper belt.

17. A device for moving an item off of a main conveyor surface comprising:
   a paddle assembly connected to a sweeper belt, wherein the paddle assembly comprises a first paddle attached to the sweeper belt at a first location, and a second paddle attached to the sweeper belt at a second location;
   wherein each of the first paddle and the second paddle is positioned to sweep over the conveyor surface to direct the item off the conveyor surface;
   wherein the first and second paddles are made of different materials; and
   wherein the first paddle comprises an attachment region for connecting to the sweeper belt, a center region to contact an article on the conveyor surface, and an end region positioned close to the conveyor surface.

18. The device as claimed in claim 17, wherein the end region is adapted to contact the conveyor surface for sliding the item across the conveyor surface.

19. The device as claimed in claim 17, further comprises: an electronic eye to sense a position of at least one paddle of the first and second paddles to determine if the sweeper belt has moved either left or right based on a known configuration of the other paddle in relation to the sensed position of the at least one paddle.

20. The device as claimed in claim 17, wherein the paddle assembly is positioned at different distances from the conveyor surface when the paddle assembly is located above the conveyor surface by adjustably connecting the sweeper belt to a frame to allow positioning of end surfaces of the paddles.

21. The device as claimed in claim 17, wherein the paddle assembly is configured to move with respect to the conveyor surface based on a likelihood of damaging the article, a size of the article, a type of article, a surface or packaging covering the article, or a speed of the main conveyor surface.

22. The device as claimed in claim 17, wherein the sweeper belt is a continuous, part-circular sweeper belt, wherein each of the first paddle and the second paddle is removably connected to the sweeper belt by a rigid bracket that is fixed to an integrated element of the continuous, part-circular sweeper belt.

23. The device as claimed in claim 17, further comprising a motorized drive roller activated by a drive roller controller to run forwards or backwards, and wherein the direction of movement of the motorized drive roller results in the left or right handed divert of the item from the conveyor surface when contacted by the paddles.

* * * * *